Figure 1:
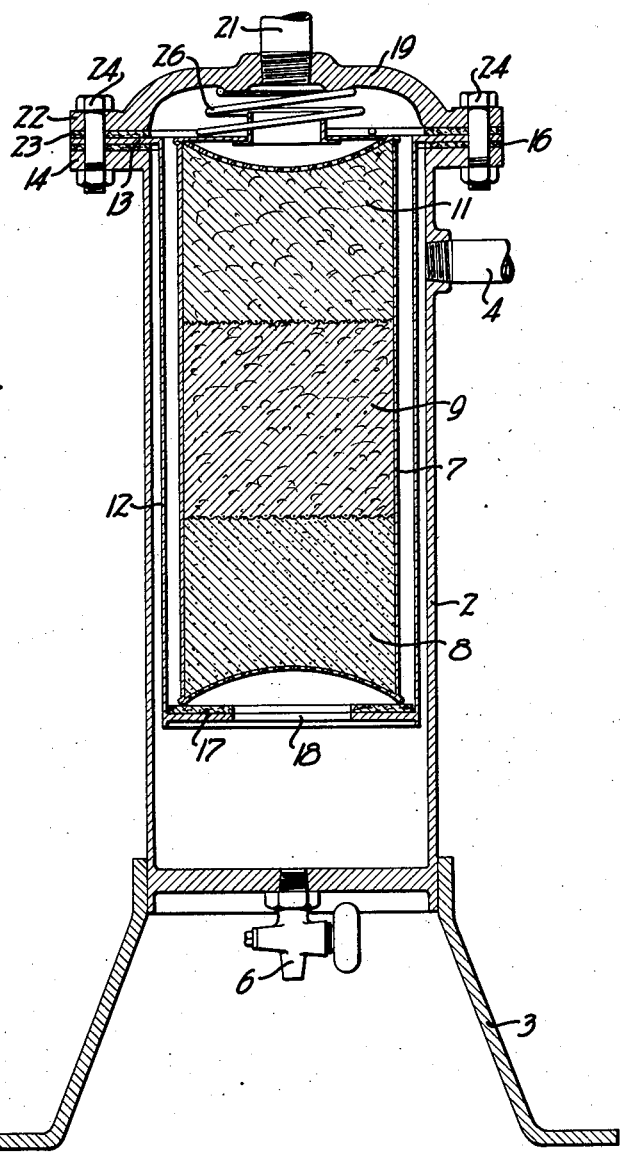

April 2, 1940.  W. J. FRICKE  2,195,565

AIR PURIFIER

Original Filed June 13, 1934

INVENTOR.
WILLIAM JOHN FRICKE
BY Charles S. Evans
HIS ATTORNEY.

Patented Apr. 2, 1940

2,195,565

UNITED STATES PATENT OFFICE 2,195,565

AIR PURIFIER

William John Fricke, San Francisco, Calif., assignor to E. D. Bullard Company, San Francisco, Calif., a corporation of California Original application June 13, 1934, Serial No. 730,401. Divided and this application September 17, 1937, Serial No. 164,383

2 Claims. (Cl. 183—48)

This is a division of my copending application Serial No. 730,401, filed June 13, 1934, now Patent No. 2,096,851 issued Oct. 26, 1937.

My invention relates to air purifiers, and the broad object of my invention is to provide means for purifying and cooling compressed air being supplied for breathing purposes.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Figure 2:
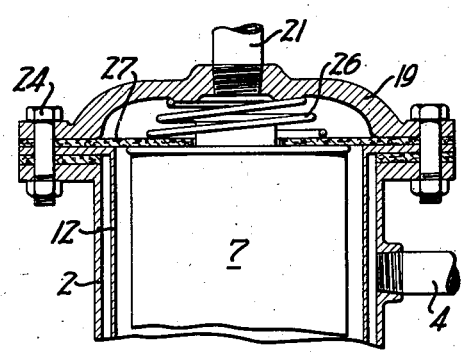

Referring to the drawing:

Figure 1 is a vertical sectional view of a purifier embodying the improvements of my invention; and Figure 2 is a fragmentary sectional view showing a modified construction.

In terms of broad inclusion, the air purifier embodying my invention comprises a chamber in which compressed air may expand to cool it and condense the entrained moisture. A canister is removably mounted in the purifier unit, through which the expanded air may pass, and suitable filtering materials are provided in the canister. The canister is preferably suspended in the expansion chamber, and a hollow head is provided on the unit for receiving the air from the canister.

In greater detail, and referring to Figure 1 of the drawing, the air purifier comprises a cylindrically-shaped casing 2 having suitable legs 3 and providing an expansion chamber for compressed air entering through an inlet 4. A drain cock 6 at the bottom of the chamber provides means for removing collected fluids. As the compressed air enters the chamber formed by casing 2 it expands. This expansion cools the warm air and also condenses the moisture, both results being desirable in conditioning the air for breathing purposes.

A canister 7 is provided in the purifier unit for removing other undesirable constituents from the air, and preferably contains three layers of filtering materials. The lower layer 8 is preferably a suitable water absorbent material, and serves to withdraw moisture not released in the expansion chamber. The intermediate layer 9 is an oil absorbent material, such as activated charcoal; and the upper layer 11 is preferably a suitable material for absorbing organic vapors.

The canister is preferably suspended in the expansion chamber by an inner chamber 12 which projects downwardly into the expansion chamber and is spaced from the side and bottom walls of the latter. A supporting flange 13 on the upper end of the inner chamber extends outwardly and overlies a flange 14 of the expansion chamber. Gasket 16 is provided between the flanges to seal the joint.

The inner chamber 12 is about the same height as the canister, so that the latter will stand upright, and a gasket 17 is provided in the bottom of the inner chamber, upon which the canister may seat. An aperture 18 in the bottom of the chamber 12 provides an opening through which air from the expansion chamber may pass into the canister.

A suitable head 19 is mounted on the upper end of the expansion chamber 2, and is hollowed out to receive the air from the canister and direct it to an outlet 21. Head 19 has a flange 22 overlying the inner chamber flange 13, and a suitable gasket 23 is also provided between these parts. The flanges are clamped together by bolts 24 when the unit is assembled.

In order to hold the canister against movement a coil spring 26 is preferably interposed between the upper end of the canister and the head 19. The pressure of this spring on the canister keeps the latter from shifting, and also presses the lower rim against the gasket 17 to insure a tight seal between the canister and the expansion chamber. By this arrangement the canister is held firmly when the unit is assembled, but may readily be removed and replaced by a fresh canister when the filtering materials are exhausted.

In the modified structure shown in Figure 2 a double seal is provided by extending the upper gasket 27 inwardly to overlie the canister. In this construction the spring 26 rests on the gasket 27, thereby sealing the upper as well as the lower end of the canister.

I claim:

1. An air purifier comprising a chamber for receiving air, a canister apertured at top and bottom and containing filtering material through which air from the chamber may pass, means within the chamber for supporting the lower end of the canister and providing communication between the chamber and lower apertures of the canister, a gasket between the lower rim portions of the canister and support, a hollow head over the chamber and communicating with the upper apertures of the canister, a gasket between the chamber and head and extending inwardly over the upper rim portions of the canister, and a spring interposed between the head and canister and bearing against the upper gasket to press the latter into sealing engagement with the canister and to simultaneously press the canister into sealing engagement with the lower gasket.

2. An air purifier comprising a chamber for receiving air, a canister apertured at top and bottom and containing filtering material through which air from the chamber may pass, an inner chamber projecting downwardly within said air chamber for encasing the canister and having an inturned flange at the bottom to provide support for the lower end of the canister, said inner chamber being open at the bottom to provide communication between the air chamber and the lower apertures of the canister, a gasket between the lower rim portions of the canister and the supporting flange, a head over the air chamber and providing communication with the upper apertures of the canister, and a spring interposed between the head and canister for pressing the latter into sealing engagement with the gasket.

WILLIAM JOHN FRICKE.